United States Patent [19]

Reed, Jr.

[11] 4,058,205
[45] Nov. 15, 1977

[54] APPARATUS FOR TREATING OIL SHALE

[76] Inventor: Thomas G. Reed, Jr., 818 Heather Court, Houston, Tex. 77024

[21] Appl. No.: 623,354

[22] Filed: Oct. 17, 1975

Related U.S. Application Data

[62] Division of Ser. No. 434,598, Jan. 18, 1974, Pat. No. 3,939,057.

[51] Int. Cl.$^2$ .................. C10B 1/10; C10B 49/04; C10B 53/06
[52] U.S. Cl. .......................................... 202/86; 48/77; 202/131; 202/136; 202/216; 202/218; 202/269; 202/270; 208/8; 208/11 R; 201/4; 201/14; 201/15; 201/16
[58] Field of Search .................. 202/86, 100, 218, 131, 202/216, 136, 133, 269, 270; 201/4, 14–16; 34/108; 110/14; 432/103, 107; 13/10, 21; 48/76–78; 208/11 R, 8

[56] References Cited

U.S. PATENT DOCUMENTS

| | | | |
|---|---|---|---|
| 2,441,386 | 5/1948 | Berg | 202/131 X |
| 2,664,389 | 12/1953 | Rex et al. | 202/131 X |
| 3,336,104 | 8/1967 | Miller | 208/11 R |
| 3,384,569 | 5/1968 | Peet | 208/11 R |
| 3,442,789 | 5/1969 | Zimmerman, Jr. | 208/8 |
| 3,481,720 | 12/1969 | Bennett | 201/15 X |
| 3,573,197 | 3/1971 | Gessner | 208/11 R |

OTHER PUBLICATIONS

Perry's et al. pp. 20-28 to 20-29 – Rotary Calciner, 4th edition, Chemical Engineering Handbook.

*Primary Examiner*—Morris O. Wolk
*Assistant Examiner*—Michael S. Marcus
*Attorney, Agent, or Firm*—Kenneth H. Johnson

[57] ABSTRACT

A process and apparatus for decomposing kerogen and recovering oil, high BTU gas and energy for the process wherein a crushed oil shale is fed to a rotary preheater (300° to 350° F.) hence into a rotary retort (850°–1050° F.) where the kerogen is decomposed and the oil evaporated, removed and condensed. From the retort the crushed shale goes to a hopper where any residual oil is stripped out by super heated steam leaving a char on the crushed shale. The stripped shale is fed into a furnace wherein the char is burned to provide heat for the process. To supplement the char and provide enough BTU's for the process, it is necessary to add a small amount of coal to the feed to the process. The hot gases from the furnace first pass into contact with the rotary retort and hence indirectly heat the oil shale in the retort. The hot furnace gases (or a portion thereof) then pass into direct contact with the crushd oil shale feed in the preheater.

8 Claims, 2 Drawing Figures

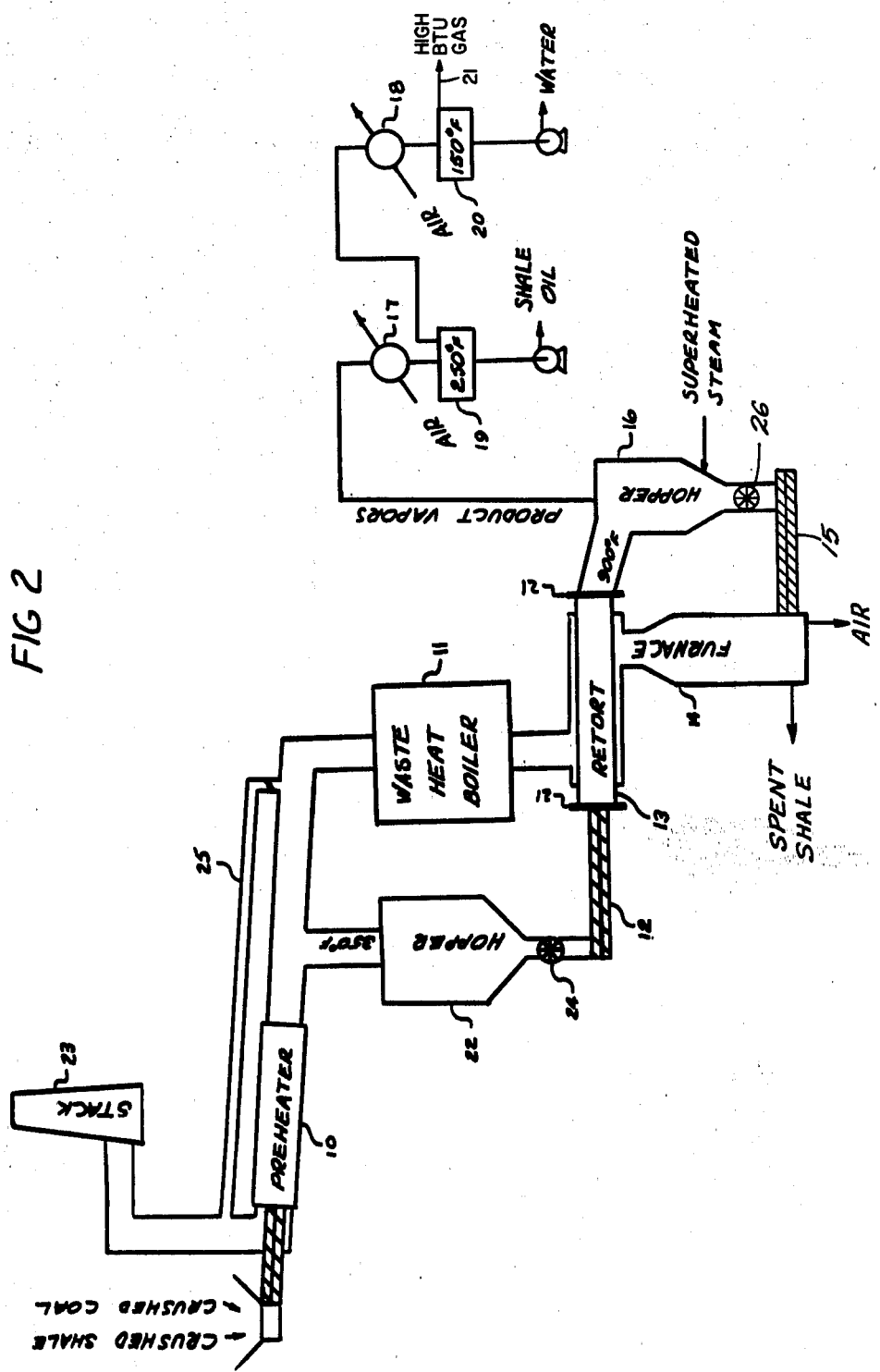

APPARATUS FOR TREATING OIL SHALE

This a division, of application Ser. No. 434,598 filed Jan. 18, 1974 now U.S. Pat. No. 3,939,057.

BACKGROUND OF THE INVENTION, FIELD OF THE INVENTION AND DESCRIPTION OF THE PRIOR ART.

This invention relates to a process for the production of crude shale oil suitable for use as a feed stock for refineries producing motor fuel and other hydrocarbon products, and particularly it relates to such a process wherein crushed oil shale is retorted in conjunction with small quantities of coal by the indirect application of heat obtained when the residual char is burned. An apparatus for the process is also disclosed.

It is well known that there is an increasing shortage of crude oil in the U.S. as older oil fields become depleted and new fields are difficult to locate and expensive to develop. It is also well known that immense reserves of petroleum are found in the shale of several western states. Research by the United States Bureau of Mines and others have proven that the oil produced from retorting this shale is suitable, after minor treatment, for refining into normal petroleum products. The techniques for mining this shale in an efficient manner with little or no adverse effect on the environment have been developed by the Bureau of Mines. Likewise techniques for disposal of spent shale in an ecologically sound manner have been published.

However until this time no economic process for retorting the shale has been invented, and as a result, no commercial shale oil producing facility has ever been constructed and operated in the United States. Several small facilities have been operated in foreign countries, especially in areas without alternative supplies of petroleum, however, the large labor requirement of the processes used made them impractical for the U.S.

The largest U.S. deposit of oil shale is known as the Green River deposit and occurs in Colorado, Utah and Wyoming. This shale is a magnesium marlstone with a finely laminated structure wherein the organic material, called kerogen, and the inorganic material are intimately mixed. The shale contains from about 60 weight percent mineral matter to about 92 weight percent and this distinguishes it from coal which contains only minor quantities of minerals. The organic portion is of such a structure that it is virtually insoluble in common organic solvents and therefore can only be released by distructive distillation. The mineral portion is reported to consist largely of dolomite, calcite, feldspars, quartz and illite clay. Trona, Nahcolite, and Dawsonite are reported to occur in or interbedded with some deposits. The inorganic particles are very small with a mean size of about 6 microns. In its natural state the shale is a strong, impervious rock consisting of the finely divided inorganic particles cemented together with the kerogen as the binder.

Upon the application of heat the kerogen decomposes into useful products. At temperatures on the order of 900° F a disproportionation of carbon and hydrogen structures occurs whereby the solid high molecular weight kerogen, which has a carbon to hydrogen ratio of about 7.8, is converted into a liquid oil with a carbon to hydrogen ratio of about 7.2. The yield of this oil is in the range of 60-70 percent of the organic matter in the raw shale. An additional 7 to 10 percent is converted into light gases and about 20 to 25 percent into a carbon rich residue retained on the inorganic material. This residue is called char. The oil thus produced normally has an API gravity of about 17 to 20 and a pour point of 70° to 90° F. At the temperatures of retorting, the oil is evaporated out of the shale.

Prior work attempting to develop economic processes for utilizing oil shale has followed several different paths. First is in situ retorting where the shale is burned in place and the heat produced decomposes the surrounding shale. This has been largely unsuccessful because of the impermeability of the shale which prevents movement of gases including both the air required for combustion and the product vapors.

Second is direct combustion retorting where crushed shale is heated by combustion occuring in the retort by burning injected fuels and/or the residual carbon remaining in the retorted shale. Commonly this is done in a vertical vessel where fresh shale is fed continuously or batchwise into the top and spent shale is removed from the bottom. Air for combustion is forced into the bottom section where combustion occurs. The hot gases pass up through the shale causing the kerogen to decompose. The product is removed as a vapor out the top and condensed. Equally common are down draft designs where the shale is fed upward and combustion occurs at the top with product removed at the bottom. These designs have the advantage of good heat efficiency but the disadvantage that the product is diluted with the combustion gases making recovery especially of light hydrocarbon gases difficult. Also since the shale contains large amounts of calcite and dolomite which decompose endothermally at 1050°–1100° F, temperature control in the combustion zone is very critical and very difficult. Also the best American shales tend to cake and fuse under extended combustion conditions making continuous discharge of spent shale difficult if not impossible.

A third type of retorting process uses hot gas to heat the shale to the temperature required for destructive distillation. In some variations, flamable gases or liquid fuels are burned either within the retort or outside it and the gases produced by the combustion are passed through the bed of shale. The shale oil produced is swept out with the gases and condensed. This process has the advantage of good temperature control and the disadvantages of dilution of the product with the undesirable products of combustion, and high fuel requirements.

Most of the directly heated retorting systems have attractive potentials, but although they have been known for many years, they have never been commercialized because the design of the necessay equipment of a size to be profitable has eluded the designers and engineers.

Another system of retorting involves the indirect heating of the shale using ceramic balls to convey the heat. The spent shale is burned in a separate vessel to supply the heat to raise the temperature of the balls to such a point that when they are mixed with the shale in a retort, the shale is heated to retorting temperatures. The spent shale and the balls are then separated and the balls recycled. This process has the advantage that the light gases produced during retorting are not diluted with the products of combustion. The disadvantages are largely mechanical. Many other processes have been reported.

In order for a shale retorting process to be of commercial importance, it should meet all of the following criteria:

1. It must be mechanically sound. That is it must be possible to design and construct at a reasonable cost equipment to carry out the process on a very large scale and such equipment must be highly reliable and trouble free.

2. The process must produce a high yield of oil and saleable high BTU gas.

3. The process must be sufficiently efficient in regard to heat consumption that little fuel is required other than the char which results from retorting.

4. The process must use a relatively small amount of water since the oil shale occurs in arid areas where little water is available.

Until now no process has met this combination of requirements.

SUMMARY OF THE INVENTION

It is therefore the object of this invention to provide a process for the producing of useful petroleum type raw materials from the retorting of naturally occuring oil shale wherein many of the disadvantages of the previously known processes are substantially avoided.

It is a further object of this invention to provide a process whereby a high BTU gas suitable after minor treatment for blending with natural gas is produced in conjunction with a crude shale oil suitable for processing into normal hydrocarbon products such as motor fuels and heating oils.

It is another object of this invention to produce shale oil and gas by a process where the additional heat requirement is made up from low temperature coke produced from the simultaneous retorting of small quantities of coal admixed with the shale.

It is yet another object of this invention to provide a process for producing shale oil and gas wherein the heat for retorting is supplied to the raw shale in an indirect manner such that the product gas is not diluted with the undesirable products of combustion, i.e., $CO$, $CO_2$, $N_2$.

It is also another object of this invention to provide a process for producing shale oil and gas employing types of equipment commonly available and well tested in commercial processes and which have been found to be mechanically sound and of high reliability.

Further purposes and objects of this invention will appear as the specification proceeds.

The foregoing objects are accomplished by providing a process for producing a crude shale oil and a high BTU gas by retorting crushed oil shale admixed with a small quantity of crushed coal in an indirectly heated, horizontal, rotary calciner equipped with mechanical seals to contain the vapors produced and a condensing system to recover the oil vapors. The process includes introducing on a continuous basis crushed shale, which has been preheated to about 300° F, to the retort where it is further heated to 900° F and held at this temperature for about 15 minutes, from which the shale is continuously discharged into a hopper, sized to permit a residence time of about 15 minutes, during which time residual vapors are swept out with a small quantity of super heated steam. The vapors from the retort and the soaking hopper are passed to a system of air cooled condensers where the shale oil and water are condensed and thus separated from the gas which is then suitable for compression and drying. The oil free shale, containing the char produced during retorting, is fed to a furnace where it is burned to produce the heat for retorting and preheating the shale. It is necessary to add the coal to provide additional heat since the char is insufficient in its self to provide all the heat required.

BRIEF DESCRIPTION OF THE DRAWINGS

Particular embodiments of the present invention are illustrated in the accompanying drawings wherein:

FIG. 2. is a diagrammatic view illustrating the process embodied in FIG. 1. in somewhat more detail.

DETAILED DESCRIPTION OF THE PREFERRED EMBODIMENTS

Figure 1:
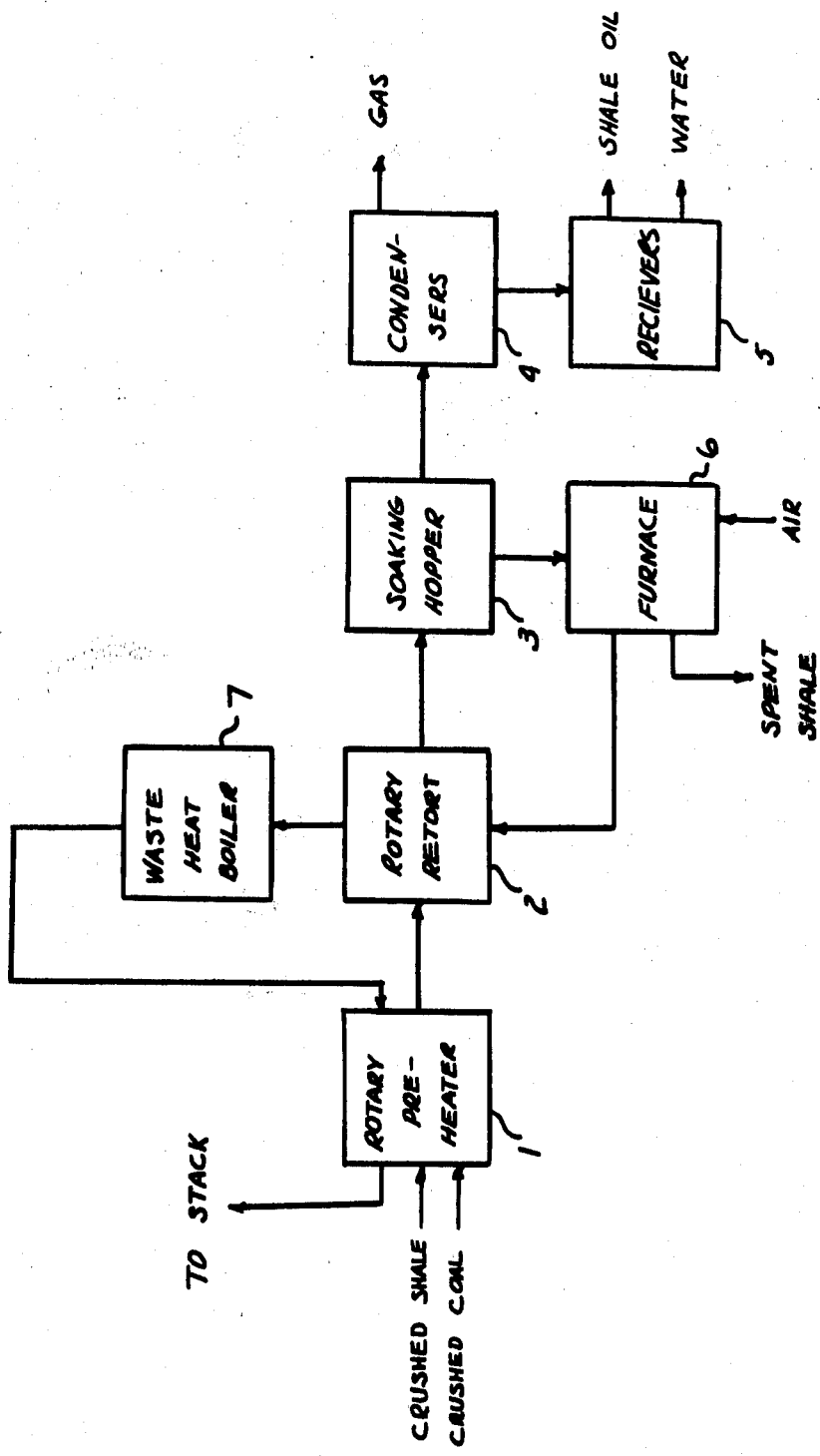
FIG. 1. is a simplified block diagram illustrating one embodiment of my process in a particularly simplified form.

Referring to FIG. 1, one embodiment of my process is illustrated in block diagram form. An indirectly fired retort 2 is provided for heating the crushed shale to the temperatures required for destructive distillation. This retort is a rotary calciner equipped with mechanical seals to prevent the product vapors from leaking to the atmosphere. Equipment of similar design is used to react gases with solids at elevated temperatures. The temperature within the retort is maintained at 850° to 1050° F, preferably between 900° F and 950° F. At temperatures below 850° F the decomposition of the kerogen is usually incomplete and at temperatures above 1050° F the mineral carbonates begin to decompose, a reaction which takes up large quantities of heat and which produces undesirable carbon dioxide which could reduce the value of the gas produced. The pressure in the retort is only a few inches of water and is the result of the vaporization of the organic material. The presence of light gases and water vapor assist in sweeping the vapors out of the retort.

The crushed shale is fed to the retort from a preheater 1, where the shale is continuously heated by directly contacting it with the hot gases from the heating chamber surrounding the retort. The temperature of these gases is moderated by cooling them in a waste heat boiler. The preheater consists of a rotary calciner in which the gases and the shale are fed cocurrently or perferably countercurrently. This calciner is of the same general design as that used for the commercial production of lime or portland cement except that the low temperatures experienced in shale preheating do not require refractory lining of the steel tube. The temperature of the shale is controlled by regulating the quantity of gas fed. The temperature of the exiting shale must be maintained below the temperature where decomposition begins. This is normally 350° F but may vary somewhat with shale from different deposits. If the temperature is allowed to exceed this temperature there will be a loss in yield since the gases from the preheater 1 are vented to the atmosphere and the organic material in the stack gas may exceed allowable limits.

The shale must be rushed sufficiently fine that the oil vapors can easily pass out of the particle. Also heat transfer is improved by using a small size. However, finely crushed shale tends to dust badly and can create serious separation problems downstream of the retort. Thus a balance must be achieved which may vary somewhat with different deposits. Typically, shale crushed to 90 percent less than ¼ inch will be satisfactory.

The product vapors and the shale are allowed to flow from the retort 2 into a hopper 3 which serves as a vapor solid separator and where the residual product vapors are allowed to escape from the shale and in fact are swept out by a small quantity of steam, which has been super heated to about 900° F, and which is introduced near the bottom of the hopper. This hopper is sized such that the residence of the shale is sufficient to permit substantially all the product vapors to be removed. The retention time required will vary somewhat with different grades of shale but will typically be about 15 to 20 minutes.

From the bottom of hopper, the retorted shale containing the char is fed to a furnace 6 where it is burned to produce the heat required for retorting. The hot gases from the furnace pass first through the heating chamber of the retort 2, then through the waste heat boiler 7 and then through the preheater 1 and are then vented out a stack after such treatment as is necessary to meet air emission standards.

The product vapors including the shale oil, the light gases and moisture pass overhead from the hopper to a condenser system 4 where the liquids are recovered and separated from the light gases. The liquids, shale oil and water, pass from the condenser to receivers and decanter 5 where the water is removed. The shale oil product is ready for storage and shipment. The vapors passing overhead of the hopper 3 will contain various amounts of solids, these solids being fine particles of shale and these must be removed prior to shipment. The quantity of solid can vary from only a trace to several percent depending on a number of factors including size of crushed shale, design of the retort 2, operating conditions of the retort 2, and the design of the soaking hopper 3. A number of devices are available for removing these solids and the selection of the best for a given retorting plant will depend on the design of the major equipment for the plant.

The furnace should be of such a design that retention of the solids is sufficiently short that decomposition of the mineral carbonates does not occur to a substantial degree and that clinkers do not form. The furnaces used for firing high ash powdered coal such as those of the cyclone design should be suitable. Once again, solid carry out is a problem and precipitators or other types of equipment for solid removal from the stack gas may be necessary to prevent a fly ash pollution problem.

It must be remembered that natural deposits such as oil shale vary somewhat in their physical properties and processes for converting these natural materials into useful products must be modified somewhat to match properties of the specific deposit to be used. However, for this invention, the basic equipment will handle a wide range of shale with only the amount of the added coal adjusted to the heat requirement of the specific shale to be treated. The richer the shale, the more char per ton that will be produced during retorting and the smaller the quantity of coal required.

Typical high quality oil shale has a density of about 140 pounds per cubic foot or about 14 cubic feet per ton. This typical shale will yield per ton upon retorting about 26.7 gallons of oil with a gravity of 7.75 pounds per gallon, about 30 pounds of light gas with a gross heating value of about 300,000 BTU and 70 pounds of char with a heating value of about 500,000 BTU. The retorting requires that shale be heated to about 900° F for about 15 minutes. The heat required to raise the temperature of the shale to 900° F is about 275 BTU per pound or 550,000 BTU per ton.

It can be seen from the above information that if the heating process were 100 percent efficient that there would be almost enough heat produced from burning the char, 500,000 BTU/ton, to retort the shale which requires 550,000 BTU/ton. However, these heating processes are relatively inefficient and additional heat is required. In this invention the additional heat is provided by adding relatively small quantities of coal to the raw shale.

The coal used will probably be a relatively high volatile type such as is found in the western states not far from the shale deposits. This coal, when heated to 900° F along with the shale undergoes a decomposition whereby about 25 percent of the coal is volatilized. The tar oil produced by this coking augments the oil from the shale.

In the preferred embodiment of this invention, the heat efficiency of the combined retort and preheater system is about 35 percent. This means that the actual heat requirement is about 1,571,000 BTU/ton of shale. Since 500,000 BTU is available from the char, 1,071,000 must come from the coal. A typical low temperature coke has a heating value of 11,700 BTU/pound. This means therefore, that 91.5 pounds of such coke must be burned per ton of shale. For a coal which is 25 percent volatilized in the retort, about 125 pounds of coal must be fed per ton of shale fed. The volatiles from the coal will increase the oil production by about 3.2 gallons per ton of shale. Obviously these quantities may vary somewhat depending on the type and quality of coal used.

Referring to FIG. 2, the process in more detail is as follows: crushed shale and crushed coal are fed continuously to a preheater 10 which is a horizontal rotary calciner where the mixture of shale and coal is contacted directly and countercurrently with hot stack gas thereby warming the feed to 300° to 350° F. The preheated feed is discharged into a hopper 22 and gas is vented through a stack 23. The preheated feed is picked up from the hopper by a conveyor 12 which continuously charges the retort 13. The conveyor is of such a design that the product gas from the retort cannot escape through the feed system. This can be accomplished by using a rotary feeder 24 or other devices commonly used for similar purposes.

The retort 13 consists of an indirectly fired horizontal rotary calciner equipped with mechanical seals 21 to retain the product vapors and prevent their contamination with gases used as a source of heat. An excellent description of indirect heat calciners of this type is found in Perry's Chemical Engineer's Handbook, 4th Edition, McGraw-Hill, New York, 1963, page 20-28, which is incorporated herein.

The product vapors and shale are discharged from the retort into a hopper 16 which serves several functions. It provides a means for separating the vapors from the solids, it provides residence time for the residual vapors to escape from the solids, and it provides storage of fuel for the furnace. A small quantity of steam, superheated to 900° F is injected near the bottom of the hopper 16 to assist in sweeping the product vapors out of the solids. The quantity of steam required will vary somewhat with the geometry of the hopper, but will be in range of about 0.1 pound of steam per ton of shale to about 10 pounds per ton, preferable 2 to 4 pounds per ton.

The vapors from the overhead of the hopper 16 pass first to a high temperature condenser 17, preferably using air as the cooling medium, where most of the shale oil is condensed. The outlet of this condenser must operate at temperatures above 212° F to avoid the condensation of water. The oil is collected in a receiver 19 from which it is pumped to storage. The gases which are uncondensed pass on to a low temperature condenser 18 where the water is condensed along with very small quantities of hydrocarbons. The temperature of the outlet of this condenser must be lower than 212° F in order to condense the water. The water is collected in a receiver 20 where the hydrocarbons are decanted and either collected or mixed with the shale oil from the high temperature receiver 19. Commercially available air cooled condensers generally consist of multiple parallel finned tubes mounted nearly horizontal with air forced over the tubes by a fan. The uncondensed gas which amounts to about 500 standard cubic feet per ton of shale is transferred to a compression and treatment unit which is beyond the scope of this invention. However it is important to note that since it was not diluted by the combustion gases, there is little or no nitrogen present and minor treatment can make this gas suitable for blending with natural gas. The steam generated in the waste heat boiler 11 can be used to drive the gas compressors.

The shale from the bottom of the hopper is conveyed using a mechanical conveyor 15 or other system of conveying to the furnace 14 where the char is burned. In the embodiment shown in FIG. 2, the steam injected into the hopper 16 serves as a gas seal preventing the loss of product. However, other sealing systems such as the rotary valve 26 could be employed.

The spent shale from the furnaces 14 is allowed to cool and then is discarded.

The hot gases from the furnace 14 are passed first through the heating chamber of the retort 13, thence through the waste heat boiler 11, thence through the preheater 10, and lastly out the stack 23. Some hot gas may bypass the preheater 10 through the bypass flue 25 by which means the preheated shale temperature is controlled.

While in the foregoing there has been provided a detailed description of a specific embodiment of the present invention, it is to be understood that all equivalents obvious to those having skill in the art are to be included within the scope of the invention as claimed.

The invention claimed is:

1. An apparatus for extracting crude oil from oil shale comprising
 a rotary preheater for receiving a feed of crushed oil shale feed,
 a rotary retort for receiving said crushed oil shale and for heating the oil shale to decompose kerogen to oil and evaporating said oil,
 means connected to and communicating with said rotary retort and said rotary preheater for transferring said crushed oil shale from said rotary preheater to said rotary retort, and
 for preventing vapors from passing from one into the other,
 a hopper means for receiving the retorted oil shale and for stripping residual oil therefrom,
 means connected to and communicating with said rotary retort and said hopper for transferring said retorted oil shale from said rotary retort to said hopper,
 a furnace for receiving the crushed oil shale substantially stripped of oil and having char thereon and for burning said char to provide hot gases for operation of said apparatus,
 means connected to and communicating with said hopper and said furnace for transferring said retorted oil shale from said hopper to said furnace,
 means for passing said hot gases from said furnace into contact with said rotary retort for indirectly heating said crushed oil shale therein, and
 means to pass said hot gases used to indirectly contact said rotary retort for direct contact with said crushed oil shale feed in said preheater.

2. An apparatus for producing a crude shale oil and high BTU gas from oil shale comprising
 a continuous feeder to meter crushed oil sahle into a preheater,
 a horizontal rotary preheater connected to and communicating with said feeder to heat the crushed shale to a temperature of about 300° F, said heating by direct contact to the shale with a flow of hot gases,
 a horizontal rotary retort to heat the curshed shale to 850° to 1050° F by the indirect contact with hot gases for decomposing kerogen to oil and vaporizing said oil.
 means connected to and communicating with said horizontal rotary preheater and said horizontal rotary retort for transferring crushed shale from said preheater to said retort, and
 for preventing vapors from passing from said retort into the preheater,
 a hopper means connected to and communicating with said retort to receive the retorted shale,
 said hopper means further comprising means for injecting super heated steam into said hopper for steam stripping the final traces of oil from the shale,
 a furnace to burn the shale char or mixtures of said char with coke to produce the hot gases required for heating the crushed oil shale,
 means connected to and communicating with said hopper and said furnace for transferring said retorted and stripped shale from said hopper to said furnace and,
 for preventing vapors from passing from one into the other,
 means for passing said hot gases into contact with said rotary retort for indirectly heating said crushed shale therein,
 means to pass said hot gases used to indirectly contact said rotary retort into said rotary preheater for direct contact with said crushed shale feed,
 a condenser means to condense the shale oil and water in the product vapors from said hopper,
 means connected to and communicating with said hopper and said condenser means for transferring said vapors from said hopper to said condenser,
 means connected to and communicating with said condenser means to provide for the separation of said shale oil and said water, and
 means connected to and communicating with said condenser means to pass the high BTU gas from the system.

3. An apparatus for extracting crude oil and high BTU gas from oil shale comprising
 a rotary preheater for receiving a feed of crushed oil shale,
 a rotary retort for receiving said crushed oil shale and for heating the oil shale to decompose kerogen to oil and evaporating said oil,
 means connected to and communicating with said rotary retort and said rotary preheater for transferring said crushed oil shale from said rotary preheater to said rotary retort, and
for preventing vapors from passing from one into the other,
a hopper means for receiving the retorted oil shale and for stripping residual oil therefrom as product vapors,
means connected to and communicating with said rotary retort and said hopper for transferring said retorted oil shale from said rotary retort to said hopper,
a furnace for receiving the crushed oil shale substantially stripped of oil and having char thereon and for burning said char to provide hot gases for operation of said apparatus,
means connected to and communicating with said hopper and said furnace for transferring said retorted oil shale from said hopper to said furnace, and
for preventing vapors from passing from one into the other,
means for passing hot gases from said furnace into contact with said rotary retort for indirectly heating said crushed oil shale therein,
means to pass said hot gases, used to indirectly contact said rotary retort, into said rotary preheater for direct contact with said crushed oil shale feed,
a condenser connected to said hopper to recover the shale oil from the product vapors,
means connected to and communicating with said condenser and said hopper for transmitting product vapors from said hopper to said condenser, and
means connected to and communicating with said condenser to pass the high BTU gas therefrom.

4. The apparatus of claim 3 wherein the means for transferring said retorted oil shale from said hopper to said furnace and for preventing vapors from passing from one into the other additionally consists of rotary feeders located between said hopper and said furnace.

5. The apparatus of claim 3 wherein additional means for keeping the vapors in said hopper separate from the vapors in said furnace consists of gas seals using steam as the gas, said gas seals being located in said hopper adjacent to means connected to and communicating between said hopper and said furnace for transferring said retorted oil shale from said hopper to said furnace and preventing vapors from passing from one into the other.

6. The apparatus of claim 3 having a waste heat boiler located between said rotary retort and said preheater through which said hot gases pass to provide reduction of the temperature of the hot gases used to indirectly contact said rotary retort, to prevent over heating of the preheater.

7. The apparatus of claim 3 wherein the condensers are air cooled.

8. The apparatus of claim 3 wherein by-pass means for by-passing a portion of the hot gas around the preheater are used to control the temperature of the preheater.

* * * * *